(12) United States Patent
Lumpe et al.

(10) Patent No.: US 6,715,822 B2
(45) Date of Patent: Apr. 6, 2004

(54) VEHICLE ROOF

(75) Inventors: Karl Heinz Lumpe, Sprockhovel (DE); Michael Gross, Bochum (DE); Klaus Kolodzeij, Wuppertal (DE)

(73) Assignee: JAC Products Deutschland GmbH, Wuppertal (DE)

(*) Notice: Subject to any disclaimer, the term of this patent is extended or adjusted under 35 U.S.C. 154(b) by 0 days.

(21) Appl. No.: 10/067,101

(22) Filed: Feb. 4, 2002

(65) Prior Publication Data

US 2002/0140253 A1 Oct. 3, 2002

(30) Foreign Application Priority Data

Feb. 6, 2001 (DE) .......................................... 101 05 167

(51) Int. Cl.⁷ .............................................. B62D 25/06
(52) U.S. Cl. ...................................... 296/210; 210/37.7
(58) Field of Search ............................ 296/210, 37.7; 224/309, 326, 329

(56) References Cited

U.S. PATENT DOCUMENTS 4,382,532 A * 5/1983 Pflugfelder .................. 224/331
5,782,392 A * 7/1998 Yamamoto ................... 224/326
2003/0001412 A1 * 1/2003 Koch ........................... 296/210

FOREIGN PATENT DOCUMENTS

| DE | 3124975 | 1/1983 |
| DE | 37 36 028 | 10/1987 |
| DE | 196 29 060 | 7/1998 |
| DE | 199 48 646 | 9/1999 |
| GB | 2303345 | 7/1996 |
| JP | 9-21630 | 1/1997 |
| WO | WO 01/56836 | 8/2001 |

* cited by examiner

*Primary Examiner*—Joseph D. Pape
(74) *Attorney, Agent, or Firm*—Harness, Dickey & Pierce P.L.C.

(57) ABSTRACT

Vehicle roof of an automobile such as a sedan or the like, with a top panel (2), a longitudinal beam (8) along each side of the vehicle serving as the connecting element between the top panel (2) and the side panels or side-wall posts (4–7), and a roof rail (3) protruding from the top panel (2) along either side of the vehicle for fastening top carrier cross members or similar elements. The longitudinal beam (8) and the roof rail (3) together constitute an integrated single-unit module (9) made from the same material.

10 Claims, 2 Drawing Sheets

VEHICLE ROOF

FIELD OF THE INVENTION

The present invention relates to the roof of an automobile such as a sedan, a limousine, a coupe, a station wagon, a van or a minibus with a top panel, a longitudinal beam along either side of the vehicle serving as the connecting element between the top panel and the side walls and/or the side-wall posts, and a roof rail protruding from either longitudinal side of the top panel of the vehicle for attaching top-carrier cross braces or the like.

BACKGROUND OF THE INVENTION

A vehicle roof of the type mentioned above has been described for instance in DE 29 39 671 A1 or in DE 199 15 546 A1, and roof rack designs which are still commonly used have been covered in publications DE 35 24 558 A1 and, respectively, DE 35 29 449 A1.

The cost of producing a car top of the type mentioned above, or of producing and mounting a roof rack, is considerable, which is why this invention is essentially aimed at simplifying such production and substantially reducing its cost.

SUMMARY OF THE INVENTION

Accordingly, for a vehicle roof of the type referred to above, it is the objective of this invention to introduce a simplified car-top and roof-rail design which is substantially more cost-effective in comparison with prior art.

According to the invention, this objective is achieved by means of an integrated, single-unit longitudinal-beam and roof-rail combination module produced from the same material.

The solution according to this invention makes it possible to avoid having to separately produce and assemble the longitudinal car-top beams and the roof rail. Integrating the roof rail into a longitudinal beam eliminates a great many components that were needed in the past, such as support legs, adapters, mounting hardware, seals and gaskets etc., thus also obviating the need for producing and stocking these components.

The module per this invention, consisting of the longitudinal beam and the roof rail, may be designed in tubular box-frame fashion, curved to follow the contour of the vehicle roof.

In a preferred implementation of this invention, the roof rail part of the module features a continuous mushroom crown or at least on one side a longitudinal recess over which a fastening element of the roof-rack cross brace can be hooked. The mushroom crown, or the longitudinal recess provided at least on one side, gives the roof-rack of the finished vehicle optimal structural stability and, on the side facing and accessible to the observer, a particularly attractive appearance (the longitudinal beam of the car top is usually concealed by a metal trim).

The appearance of the roof-rail section of the module can be substantially enhanced if, according to a desirable variation of this invention, at least that roof-rail section is painted or anodized. The module may consist of steel or aluminum.

In a preferred implementation of this invention the module, composed of a possibly pre-bent tubular-frame, a longitudinal-beam and a roof-rail section, is produced by a forming process employing high internal pressure. In that process the tubular frame section, perhaps in the form of a contoured extrusion, is bent to follow the curvature of the object vehicle roof and is placed in the cavity of a tool that corresponds to the intended shape of the module, whereupon the forming tool is closed and a pressure medium is applied which causes internal pressure to build up inside the tubular frame section, stretching the tube to where it fully hugs the cavity wall of the forming tool. The preferred pressure medium is water, applied at a pressure of 2000 to 3000 bar. A forming process that employs high internal pressure is a simple and cost-effective way to produce a module encompassing a longitudinal-beam and a roof-rail section with a high degree of reproducible accuracy as well as product and product-surface quality. Tests have shown that cross-sectional modifications such as roof-rail end sections that slope off in height for instance relative to the longitudinal beam or which are tapered lengthwise, present no problems in production. Within broad limits it is possible, of course, to satisfy customer preferences relative to special cross-sectional configurations of the module both in terms of the longitudinal beam and of the roof rail.

The desire of car makers to increasingly use modular vehicle components is met by a design version of this invention in which the metal roof is inseparably connected to the modules that encompass a longitudinal-beam and a roof-rail section, constituting, together with the attached car ceiling, a complete prefabricated assembly unit. The car ceiling may include a fabric roof lining and/or interior soft trim, sun visors, inside rear view mirror, interior lighting, wiring, operating and instrument-panel elements, sliding or sun roof and its mounts and actuating elements, handles, and more. It will be necessary for such a prefabricated assembly unit to be so configured as to match the connecting points of the side walls or side-wall posts of the vehicle.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
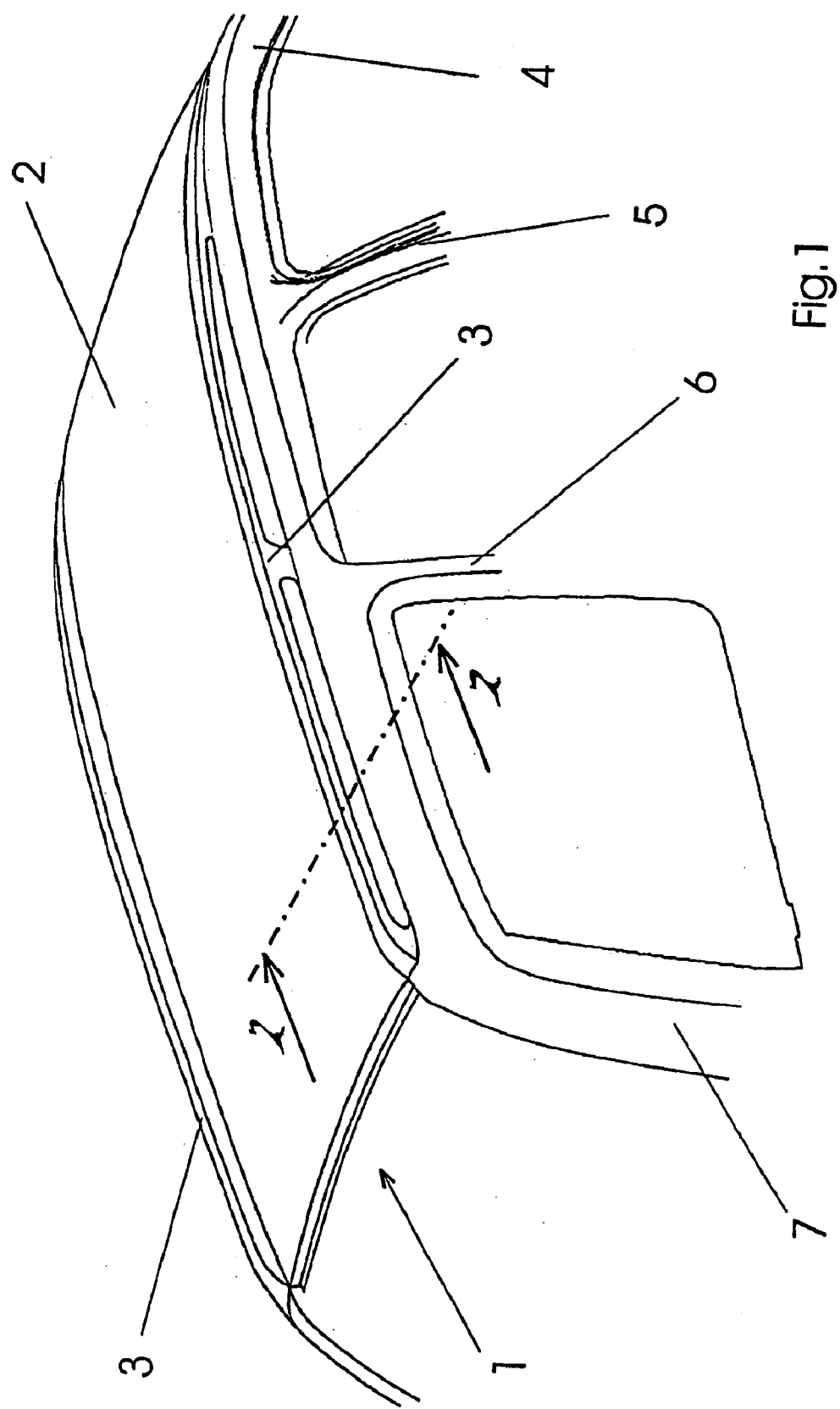
FIG. 1 is a top view of the roof of a vehicle.

FIG. 1 shows the outline of the top of a car 1 including the top panel 2 and the roof rails 3 protruding from the top panel 2 and extending along the lateral edge of the vehicle roof. The vehicle roof is supported by the side-wall frame of the car body, i.e. by the lateral posts (post A=4, post B=5, post C=6 and post D=7).

Figure 2:
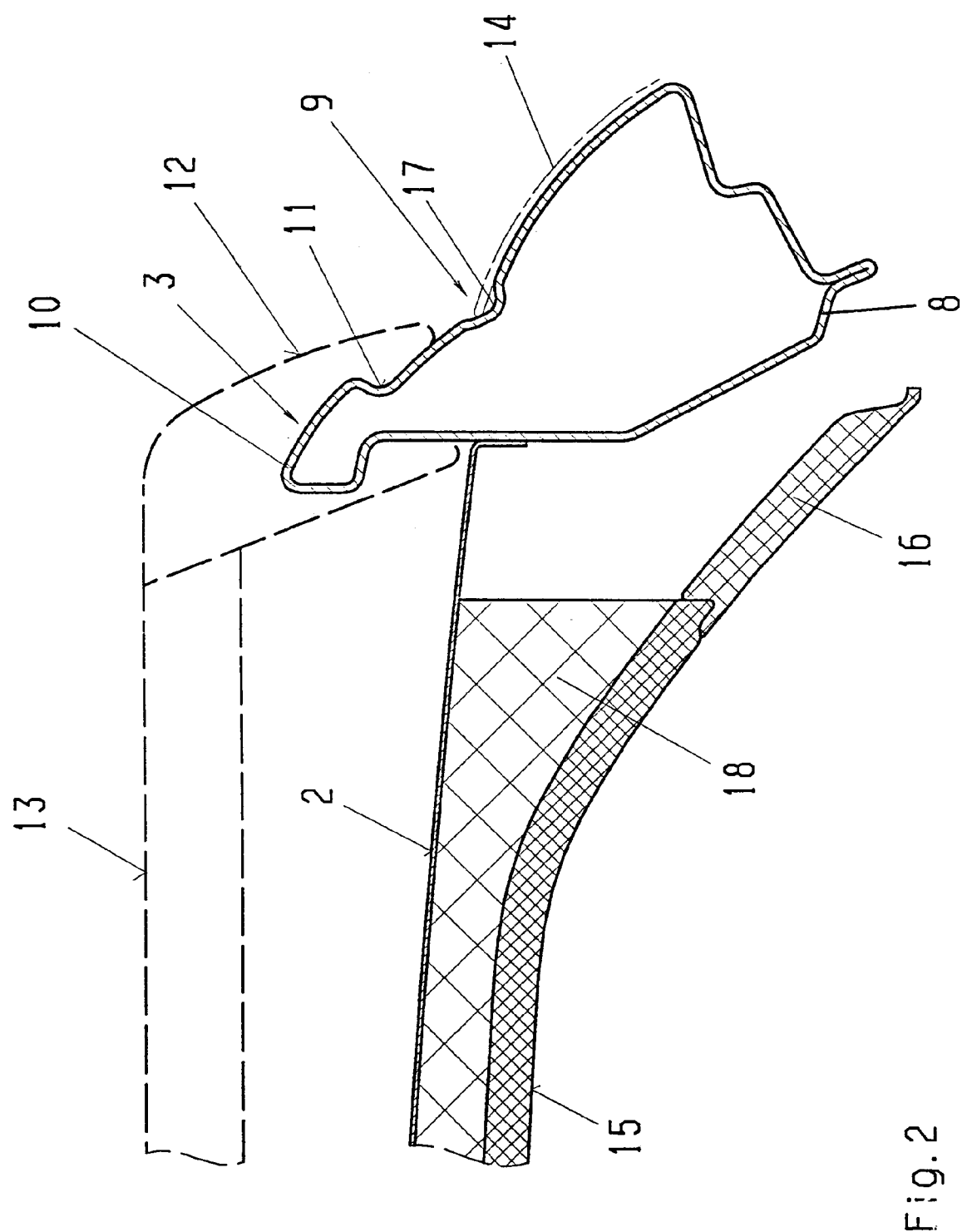
FIG. 2 is a cross-section view roughly along-the line II—II in FIG. 1.

The cross-section view in FIG. 2 shows that each roof rail 3 is an integrated extension of a longitudinal beam 8 that is part of a roof frame, not illustrated, meaning that each roof rail 3 together with its associated longitudinal beam 8 constitutes an integrated, single-unit module 9 made of the same material, for instance steel or aluminum. This module 9 is shaped as a tubular box frame whose cross section is adapted to whatever the requirements may be. The roof-rail section of the module 9 features a mushroom-type crown 10. It is equally possible, however, to merely provide the roof rail with a longitudinal throat 11. In any event the roof-rails 3 should feature a recess over which the fastening elements 12 of a top carrier cross member 13, indicated by a dashed line, can be hooked.

The module 9 with a roof-rail and a longitudinal-beam section is produced by a forming process employing high internal pressure, in the application of which the inventors have come to realize that this method also permits the creation of combinations of components, which would otherwise be produced separately, into one single module, in one single operation and with optimal production results. In the past the longitudinal beams would consist of several suitably shaped metal strips welded together, whereas it is now possible to produce one single-unit tubular section, constituting a longitudinal beam 8, by applying high internal pressure in a forming tool, with the added benefit of also encompassing an integrated roof rail 3.

The longitudinal beam 8 is largely concealed since toward the outside of the vehicle it is covered by a metal trim 14, represented by the dotted line, and on the inside by a ceiling 15, a post enclosure 16 or other covering elements not illustrated. Accordingly, the longitudinal beam 8 does not require any particular surface finish. The situation is different in the case of the roof rail which not only serves for the mounting of top carriers 13 but also as an integral styling element of the vehicle. Therefore, at least where visible, the roof rail is painted for instance in the color of the car or, for enhanced appearance, it is even anodized.

Over the extent of its length the module 9 may vary in terms of its cross section. For example, the ends of the roof rail 3 may gently slope off toward the top panel 2. The module may also be provided with small groove-shaped recesses 17 in which the metal trim 14 covering the longitudinal beam 8 can engage and terminate in neat fashion.

As shown in FIG. 2, the top panel 2 is attached to the longitudinal beam 8 of the module 9 by means for instance of currently common methodology such as cementing. However, this invention now provides for the possibility of inseparably connecting the top panel 2 to the modules 9, each composed of a longitudinal-beam and a roof-rail section, representing in conjunction with the ceiling 15 that is attached to the top panel a prefabricated assembly unit which, constituting the complete roof assembly, is to be mounted on the side walls or side-wall posts 4–7 of the vehicle. In the design example shown, the roof assembly consists of the top panel 2, the modules 9 each with a roof rail 3 and a longitudinal beam 8, the ceiling 15 and an intermediate layer 18 between the top panel 2 and the ceiling 15. The roof assembly thus features a sandwiched structure, with the intermediate layer 18 consisting for instance of a plastic foam material. Between the top panel 2 and the intermediate layer 18 and again between the intermediate layer 18 and the ceiling 15 adhesive layers of physically or chemically cured cement types may be provided. The ceiling 15 may transition into a roof-frame molding or side-post trim.

While not illustrated that way, the roof assembly may be equipped with one or several pre-installed features and accessories such as a ceiling liner, interior trims and moldings, sun visors, interior lighting, handles etc.

What is claimed is:

1. A roof for a vehicle, comprising:

a metal top panel;

longitudinal beams running along longitudinal sides of the vehicle connecting the top panel and side walls of the vehicle; and a roof rail protruding along either side of the vehicle enabling selective attachment of top carrier cross braces, wherein the longitudinal beams and the roof rail constitute an integral, single-unit module made from the same material.

2. The roof as in claim 1, wherein the longitudinal beams comprise a tubular box-frame construction.

3. The roof as in claim 1, wherein the longitudinal beams are bent along a curvature in adaptation to a contour of the vehicle.

4. The roof as in claim 1, further comprising a continuous mushroom-like crown over which the cross braces can be fixedly attached.

5. The roof as in claim 1, wherein a surface of at least a portion of the roof-rail is painted.

6. The roof as in claim 1, wherein the longitudinal-beam and the roof-rail are produced by a forming process employing high internal pressure.

7. The roof as in claim 1, wherein the top panel is fixedly connected to the longitudinal beams, and together with a ceiling attached to the top panel, constitutes a prefabricated assembly.

8. The roof as in claim 7, wherein the ceiling includes at least one of the group comprising: a lining, interior trim and moldings, sun visors, interior rear-view mirror, interior lighting, wiring, operating and instrument-panel elements, sliding/sun roof and corresponding frame and actuating elements, and handles.

9. The roof as in claim 7, wherein the prefabricated assembly is configured to mate with the vehicle side walls.

10. The roof as in claim 1, further comprising a longitudinal recess adjacent to the top panel to which the cross braces can be fixedly attached.

* * * * *